(12) United States Patent
Min et al.

(10) Patent No.: US 9,184,906 B1
(45) Date of Patent: Nov. 10, 2015

(54) CONFIGURABLE PULSE AMPLITUDE MODULATION CLOCK DATA RECOVERY

(71) Applicant: ORACLE INTERNATIONAL CORPORATION, Redwood City, CA (US)

(72) Inventors: Jihong Min, Ann Arbor, MI (US); Dawei Huang, San Diego, CA (US); Jianghui Su, San Diego, CA (US); Hongtao Zhang, Sunnyvale, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/492,420

(22) Filed: Sep. 22, 2014

(51) Int. Cl.
*H04L 7/00* (2006.01)

(52) U.S. Cl.
CPC .................................... *H04L 7/0016* (2013.01)

(58) Field of Classification Search
USPC .................. 375/355, 362, 367, 371; 370/503, 370/514–516
See application file for complete search history.

(56) References Cited

U.S. PATENT DOCUMENTS

| | | | |
|---|---|---|---|
| 8,923,380 B1* | 12/2014 | Malhotra ....................... | 375/232 |
| 8,964,818 B2* | 2/2015 | Longo et al. .................. | 375/219 |
| 2005/0180536 A1* | 8/2005 | Payne et al. ................... | 375/354 |
| 2005/0238093 A1* | 10/2005 | Payne et al. ................... | 375/224 |
| 2010/0172629 A1* | 7/2010 | Shirakawa et al. ............. | 386/85 |
| 2013/0230093 A1* | 9/2013 | Aziz et al. ..................... | 375/233 |
| 2013/0243070 A1* | 9/2013 | Ito et al. ........................ | 375/233 |
| 2013/0243107 A1* | 9/2013 | Chmelar et al. ............... | 375/259 |
| 2014/0169440 A1* | 6/2014 | Kotagiri et al. ................ | 375/233 |

OTHER PUBLICATIONS

Kurt H. Mueller and Markus Muller, Timing Recovery in Digital Synchronous Data Receivers, IEEE Transactions on Communications, vol. Com-24, No. S, May 1976, pp. 516-531.
J. Zerbe, et al., Equalization and Clock Recovery for a 2.5-10Gb/s 2-PAM/4-PAM Backplane Transceiver Cell, 2003 IEEE International Solid-State Circuits Conference, 10 pages.
Fulvio Spangna, et al., A 78mW 11.8Gb/s Serial Link Transceiver with Adaptive RX Equalization and Baud-Rate CDR in 32nm CMOS, 2010 IEEE International Solid-State Circuits Conference, 3 pages.
David R. Stauffer, et al., Comparison of PAM-4 and NRZ Signaling, Mar. 10, 2004, IBM, 27 pages.

\* cited by examiner

*Primary Examiner* — Khanh C Tran
(74) *Attorney, Agent, or Firm* — Marsh Fischmann & Breyfogle LLP; Daniel J. Sherwinter (57) ABSTRACT

Embodiments include systems and methods for using generalized pulse amplitude modulation (PAM-X) signaling with an at-rate not-return-to-zero (NRZ) clock data recovery (CDR) system. Some implementations include dual-mode signaling for an at-rate CDR (e.g., using standard NRZ signaling at lower operating frequencies and pseudo-NRZ signaling derived from PAM-X signaling at higher operating frequencies. Embodiments derive an apparent direction of signal transition from PAM-X signaling. The direction can be used to calculate pseudo-NRZ values. For example, when the PAM-X signal transitions in an upward direction, a pseudo-current NRZ value and a pseudo-previous NRZ value of '−1' and '+1' can be generated, respectively. An at-rate NRZ CDR can use the pseudo-NRZ values and a derived error value to make an offset determination. The offset determination can then be used to offset a generated clock signal in the CDR system.

20 Claims, 5 Drawing Sheets

| PAM-4 | | Signal Direction | Pseudo-NRZ | |
|---|---|---|---|---|
| Previous | Current | | Previous | Current |
| -3 | Any | ↑ | -1 | +1 |
| -1 | -3 | ↓ | +1 | -1 |
| -1 | -1, +1, +3 | ↑ | -1 | +1 |
| +1 | +1, -1, -3 | ↓ | +1 | -1 |
| +1 | +3 | ↑ | -1 | +1 |
| +3 | Any | ↓ | +1 | -1 |

CONFIGURABLE PULSE AMPLITUDE MODULATION CLOCK DATA RECOVERY

FIELD

Embodiments relate generally to clock data recovery circuits, and, more particularly, to techniques for error signal translation for configurable pulse amplitude modulation (PAM) clock data recovery circuits.

BACKGROUND

As the demand continues to increase for high-speed computing applications, such applications often rely on increasing efficiency in both the energy and bandwidth of communications links. For example, serializer/deserializer (SERDES) circuits are becoming ubiquitous in many computational environments. The SERDES can compress a relatively wide, parallel input into a relatively narrow, serial signal (e.g., a single "bit," differential signal) for communication over a serial bus. The serial bus switches at an appreciably higher rate than the parallel bus, and serial communication of the data stream tends to reduce cost, complexity, power, and board real estate relative to comparable parallel communications. As bus speeds increase, parallel communications manifest even higher power consumption and more issues relating to timing (e.g., skew mismatches and bit misalignment), making SERDES circuits even more attractive.

Typically, the SERDES has one or more components that sample a received analog serial signal into discrete bits for various purposes. For example, the SERDES can include clock data recovery (CDR) and decision feedback equalization (DFE) adaptation components that can attempt to shift clocking locations to optimize sampling reliability. This can involve determining where signal transitions (e.g., zero-crossings) occur, which can often be frustrated by clock jitter, noisy data, small signal levels, and/or other difficult conditions.

Higher frequency operation can manifest other issues, as well. For example, at higher frequencies, more signal is often lost due to physical characteristics of electric pathways, and more functional blocks typically are inserted into such communications systems to mitigate and/or compensate for those losses. Another issue is that clock generating circuits, which are often some of the most power-hungry portions of such circuit systems, tend to consume even more power at higher frequencies. Thus, while it can be desirable to improve serial communications and other signaling in high-performance digital applications, such improvements are often constrained by energy and/or bandwidth considerations.

BRIEF SUMMARY

Among other things, embodiments provide novel systems and methods for using generalized pulse amplitude modulation (PAM-X) signaling with an at-rate not-return-to-zero (NRZ) clock data recovery (CDR) system. Some embodiments operate in context of a CDR circuit of a serializer/deserializer (SERDES) or other receiver circuit, for example, for serial communications technology for high-performance digital systems. Some implementations facilitate dual-mode signaling for an at-rate CDR. For example, the CDR can use standard NRZ signaling at lower operating frequencies (e.g., with lower workloads) and can use novel, pseudo-NRZ signaling derived from PAM-X signaling for higher operating frequencies (e.g., with higher workloads). As described herein, embodiments derive an apparent direction of signal transition from PAM-X signaling. The direction of signal transition can be used to calculate pseudo-current NRZ values and pseudo-previous NRZ values. For example, when the PAM-X signal transitions in an upward direction (e.g., regardless of the details of the transition), a pseudo-current NRZ value and a pseudo-previous NRZ value of '−1' and '+1' can be generated, respectively. An at-rate NRZ CDR (e.g., a Mueller-Muller (MM) NRZ CDR, or the like) can use the pseudo-NRZ values and a derived error value to make an offset determination. The offset determination can then be used to offset (e.g., phase-shift) a generated clock signal in the CDR system. While some embodiments are described as including a "PAM to NRZ circuit," or the like, the implementations can perform PAM to "pseudo-NRZ" functionality, as described below.

According to one set of embodiments, a system is provided for at-rate clock data recovery. The system includes a clock generator circuit, a PAM to NRZ circuit, and an at-rate CDR circuit. The clock generator circuit is disposed to generate a clock signal according to a received reference clock signal. The PAM to NRZ circuit is disposed to: sample a received data signal over a number of sampling times according to the generated clock signal to generate a number of PAM-X values; derive an apparent direction of movement of the data signal and an error value from the PAM-X values; and calculate a pseudo-current NRZ value and a pseudo-previous NRZ value according the derived apparent direction of the data signal. The at-rate CDR circuit is disposed to generate an offset determination as a function of the pseudo-current NRZ value, the pseudo-previous NRZ value, and the error value.

According to another set of embodiments, a method is provided for at-rate clock data recovery (CDR) in a CDR system. The method includes: generating a clock signal according to a reference clock signal received by the CDR system; sampling a data signal received by the CDR system, the sampling being over a number of sampling times according to the generated clock signal to generate a number of PAM-X values; deriving an apparent direction of movement of the data signal and an error value from the PAM-X values; calculating a pseudo-current NRZ value and a pseudo-previous NRZ value according the derived apparent direction of the data signal; generating an offset determination as a function of the pseudo-current NRZ value, the pseudo-previous NRZ value, and the error value; and offsetting the generated clock signal in the CDR system according to the offset determination.

According to another set of embodiments, a circuit is provided for at-rate clock data recovery. The circuit includes: a receiver analog front-end sub-circuit disposed to sample a received data signal over a number of sampling times according to a generated clock signal derived from the data signal, such that the sampling generates a number of PAM-X values; a signal buffer sub-circuit disposed to parallelize sets of the sampled PAM-X values; and a comparator sub-circuit. The comparator sub-circuit is disposed to derive apparent directions of movement of the data signal and error values from the parallelized sets of sampled PAM-X values, and to calculate pseudo-current NRZ values and pseudo-previous NRZ values according the derived apparent directions of the data signal.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Many electronics applications include communications channels that have transmitter and receiver components to move data through the electronics application. Some receiver circuits are serializer/deserializer (SERDES) receiver circuits that can, for example, convert parallel data from the communications channel into a serial data stream for processing, etc. Various functions of the SERDES rely on clocking to effectively sample and/or process the data being received from the channel, and the clock signal is often recovered from the data itself using a clock data recovery (CDR) circuit. Some CDR circuits (e.g., Mueller-Muller (MM) CDRs) use data samples to recover clock timing information. Thus, the rate of the resulting clock signal is the data rate, and such CDR techniques are often referred to as "at-rate" CDRs. At-rate CDR techniques provide various features, such as avoiding double-rate clocking, which can appreciably reduce power consumption.

Still, while serial communications of the data stream (over a serial bus) tends to reduce cost, complexity, power, and board real estate relative to comparable parallel communications, compression of the relatively wide, parallel input into a relatively narrow, serial signal typically involves switching at an appreciably higher rate than that of the parallel communications. It is generally desirable for the receiver circuit to clock received data in the center of the "data eye," which can improve data recovery, reduce error, increase link margin, etc. Finding the optimal clocking location is typically a dynamic process that involves the CDR circuit and equalization circuitry (e.g., a decision feedback equalizer, linear equalizer, feed-forward equalizer, etc.). Typical at-rate CDR techniques extract timing information by analyzing a channel pulse response at one or more sample locations and determining whether current clocking appears to be early or late with respect to the pulse response. The clocking signal can then be shifted, as appropriate. However, a number of factors, such as inter-channel interference and clock jitter, can tend to frustrate accurate clock data recovery from the channel pulse response, particularly as bus speeds continue to increase.

Higher frequency operation can manifest other issues, as well. For example, at higher frequencies, more signal is often lost due to physical characteristics of electric pathways, and more functional blocks typically are inserted into such communications systems to mitigate and/or compensate for those losses. Another issue is that clock generating circuits, which are often some of the most power-hungry portions of such circuit systems, tend to consume even more power at higher frequencies. Thus, while it can be desirable to improve serial communications and other signaling in high-performance digital applications, such improvements are often constrained by energy and/or bandwidth considerations.

Traditional at-rate CDR implementations tend to use NRZ signaling. At least because NRZ signaling involves relatively simple transitions, it can be implemented with less complexity and without increasing clocking speeds. On the contrary, PAM signaling, while more desirable for various reasons, tends to involve more complex signaling (e.g., stacked transitions), higher clocking speeds, and other considerations that have limited its adoption in the CDR context.

As described herein, embodiments use PAM-X signaling to derive pseudo-NRZ values. The pseudo-NRZ values can be used by an at-rate NRZ CDR to provide clock data recovery functionality (e.g., to phase-shift data clocking to reduce error). Some implementations facilitate dual-mode signaling by permitting the at-rate NRZ CDR to use either standard NRZ signaling or the derived pseudo-NRZ signaling. For example, the same at-rate NRZ CDR circuit can use standard NRZ signaling at lower frequencies (e.g., for lower workloads) and derived pseudo-NRZ signaling at higher frequencies (e.g., for higher workloads). Accordingly, some embodiments are described as generally including a "PAM to NRZ circuit," or the like. However, such implementations are understood herein to perform at least PAM to "pseudo-NRZ" functionality, as described below.

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention. For the sake of added clarity, the term "pseudo-NRZ" is used herein to indicate values, signaling, or the like that can be treated as NRZ information by an NRZ CDR, but is derived from PAM-X information (i.e., it may not be actual NRZ data, but it functions as NRZ data). Further, some embodiments include discussion of an "apparent" direction of movement. Such terminology in intended to indicate a determination of what appears to be the direction of movement of a data signal, regardless of whether that is the actual direction (e.g., in one implementation, non-movement of the data signal can be treated as an apparent upward or downward direction of movement).

Figure 1:
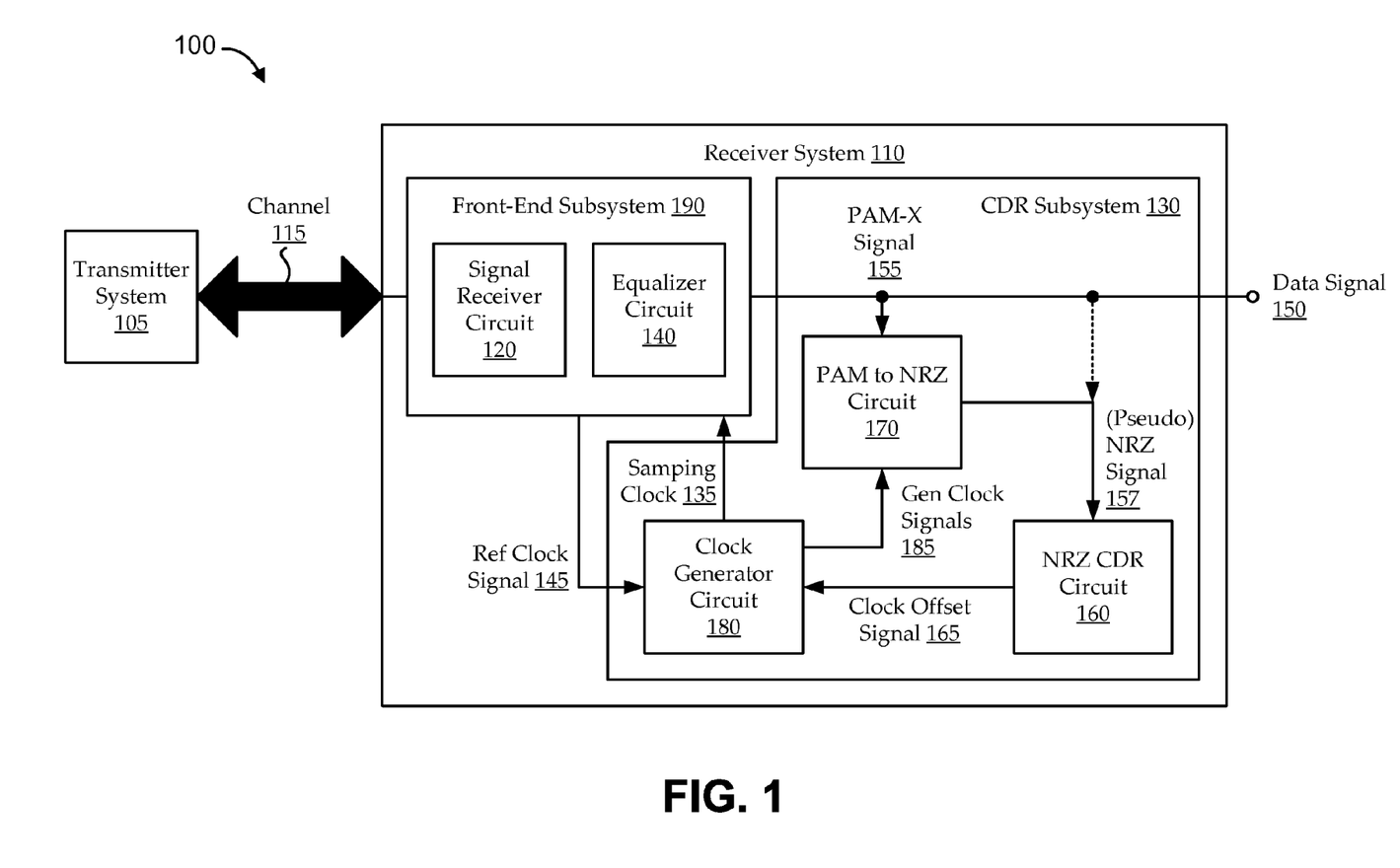
FIG. 1 shows a block diagram of an illustrative communications environment, according to various embodiments.

Turning first to FIG. 1, a block diagram is shown of an illustrative communications environment 100, according to various embodiments. The communications environment 100 includes a transmitter system 105 and a receiver system 110 in communication via a data channel 115. For example, the transmitter system 105 can include any suitable components, such as a driver, for communicating data over the data channel 115. The data channel 115 can be any parallel or serial, wired or wireless, or other suitable communications channel for carrying the data. The receiver system 110 can be implemented in any suitable manner, for example as an integrated circuit that is part of and/or in communication with very-large-scale integration VLSI circuits, communication systems, storage area networks, local area networks, wide area networks, data centers, memory components, electronic devices, memory systems, and/or computer systems (such as multiple-core processor computer systems, computer systems that include components that communicate via capacitive proximity communication, computer systems that include components that communicate via optical proximity communication, etc.).

As illustrated, the receiver system 110 includes a front-end subsystem 190 and a CDR subsystem 130. In general, the front-end subsystem 190 receives an input signal from the channel 115 and extracts a data signal 150 and a reference clock signal 145, which the CDR subsystem 130 can use to provide clock data recovery functionality. While the receiver system 110 is illustrated as a simplified functional block diagram to avoid overcomplicating the description and figures, these simplifications should not be construed as limiting embodiments and implementations. The receiver system 110 can include fewer or additional components, and the various functional blocks can each be implemented as one or more discrete components, combined with other functional blocks into a single component, implemented in any suitable architecture or arrangement, etc. For example, the receiver system 110 includes any suitable components for receiving an input data signal from the data channel 115 and reliably outputting a clock-recovered output data signal 150 as desired by other systems or components in communication with the receiver system 110.

As illustrated, the front-end subsystem 190 can include a signal receiver circuit 120 and an equalizer circuit 140. The signal receiver circuit 120 can include amplifiers, filters, analog-to-digital converters, parallel or serial interface components, and/or any other suitable components for converting the received data signal from the data channel 115 into a signal that can be used by other components of the receiver system 110, including the CDR subsystem 130. The signal receiver subsystem 120 can be configured to provide a pulse amplitude modulation (PAM) signal representing the serial input data. The equalizer circuit 140 can include a decision feedback equalizer, a linear equalizer, a feed-forward equalizer, and/or any other suitable equalization components. For example, some implementations of the equalizer subsystem 140 provide feedback equalization to the CDR subsystem 130 including outputting a reference clock signal 145 to the CDR subsystem 130.

Embodiments of the CDR subsystem 130 can generally find directions (early or late) and magnitudes of clock-related jitters by sampling data. For example, phase data can be extracted from sampling of an impulse response of the data signal, and clock jitter can cause the sampling point to be shifted to the left or right (i.e., early or late). Some conventional approaches have been developed to recover proper timing, such as the Mueller-Muller (MM) timing recovery algorithm, which seeks to utilize a minimum number of samples. Smaller numbers of samples can lead to fewer computations, which can save energy.

Embodiments described herein can implement an at-rate CDR, such as a MM CDR, or the like in a modified manner that exploits energy-efficient digital circuits for improved performance in reliability and bandwidth efficiency. For example, embodiments of the CDR subsystem 130 can translate received PAM-X (e.g., PAM-4) signaling into "non return to zero" (NRZ) signaling to facilitate efficient computation of offset signaling. PAM signals can typically handle more data without increasing frequency as compared to NRZ signals. For example, at higher frequencies, more signal data can be lost due to physical characteristics of the electric cable (or other transmission medium), so that more functional blocks are typically inserted into the communications system to mitigate and/or account for those losses. Further, the power consumption of clock generating circuits, often some of the most power-hungry parts of the system, sharply increases with frequency. In such contexts, PAM-X can provide features over conventional NRZ signaling, for example, including efficient bandwidth use. However, PAM-X signaling can manifest certain difficulties, such as the signaling can be more difficult to predict than that of NRZ, stacked signals can turn out to have comparatively more complicated transitions, etc. Thus, the PAM-to-NRZ conversion can facilitate efficient, controllable clock data recovery.

Some embodiments of the CDR subsystem 130 include a PAM to NRZ circuit 170, an NRZ CDR circuit 160, and a clock generator circuit 180. For example, the front-end subsystem 190 can output an output data signal 150 for use by the PAM to NRZ circuit 170 and a reference clock signal 145 for use by the clock generator circuit 180. The PAM to NRZ circuit 170 can translate a PAM-X signal 155 into a pseudo-NRZ signal 157 based on the PAM-X signal 155 transitions and generated clock signals 185 from the clock generator circuit 180. The NRZ CDR circuit 160 can use the pseudo-NRZ signal 157 to make early/late determinations about the clocking of the signal to generate an appropriate clock offset signal 165. The clock offset signal 165 can be fed back to the clock generator circuit 180 to shift the generated clock signals 185 in one direction or the other. Some embodiments of the NRZ CDR circuit 160 can operate as "dual mode" circuits, such that they can receive either PAM-X or NRZ signals. For example, the NRZ CDR circuit 160 can be configured to operate in substantially the same manner, whether it receives a pseudo-NRZ signal 157 from the PAM to NRZ circuit 170 or an actual NRZ signal from the front-end subsystem 190.

For example, embodiments of the PAM to NRZ circuit 170 sample a data signal (e.g., a PAM-X version of the CDR channel pulse response) to generate a number of PAM-X values using a clock signal 185 generated according to a reference clock signal 145 derived from the data signal. For example, the PAM-X values are PAM-4 values, corresponding to four different pulse amplitude levels. The four levels can be represented as 'V=−3,' 'V=−1,' 'V=+1,' and 'V=+3'; as '00,' '01,' '10,' '11'; etc. The PAM-X values can correspond to multiple sample times (or sub-sample times, where the values are sampled in a faster clock domain than that of the reference clock). The PAM to NRZ circuit 170 can calculate first and second NRZ values (pseudo-NRZ values) according to the PAM-X values. The first NRZ value can be the complement of the second NRZ value (i.e., the first NRZ value is the logical 'NOT' of the second NRZ value; for example, if the first NRZ value is '1', the second NRZ value can be '0' or '−1', depending on the implementation). The NRZ values can be generated to effectively represent a pseudo-current NRZ state and a pseudo-previous NRZ state. The NRZ CDR circuit 160 can generate an offset signal 165 according to the first and second NRZ values. The clock generator circuit 180 can use the clock offset signal 165 to offset (i.e., correct) the generated clock signal 185 in the CDR subsystem 130. In some embodiments, the clock generator circuit 180 can feedback a sampling clock 135 to the front-end subsystem 190.

Figure 2:
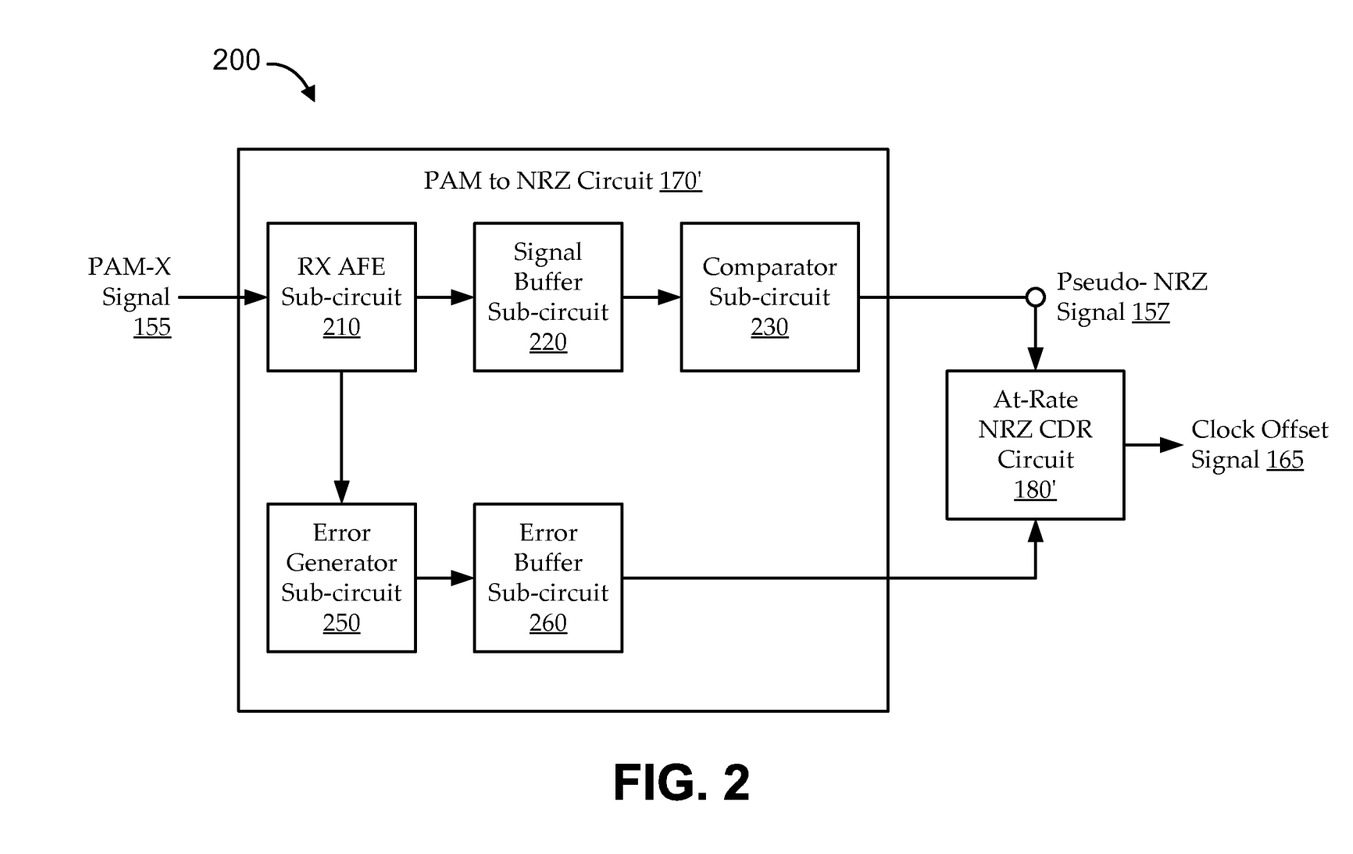
FIG. 2 shows a clock diagram of an illustrative conversion circuit, including an illustrative PAM to NRZ circuit and an illustrative NRZ CDR circuit, according to various embodiments.

FIG. 2 shows a clock diagram of an illustrative conversion circuit 200, including an illustrative PAM to NRZ circuit 170' and an illustrative NRZ CDR circuit 180', according to various embodiments. The PAM to NRZ circuit 170' and the NRZ CDR circuit 180' can be implementations of the PAM to NRZ circuit 170 and the NRZ CDR circuit 180 of FIG. 1, respectively. As illustrated, the PAM to NRZ circuit 170' includes a number of sub-circuit blocks for performing respective functions, such as a receiver analog-front-end (RX AFE) sub-circuit 210, a signal buffer sub-circuit 220, a comparator sub-circuit 230, an error generator sub-circuit 250, and an error buffer sub-circuit 260. The various sub-circuits are shown as discrete functional blocks for the sake of clarity and should not be construed as limiting the scope of the invention. For example, each sub-circuit can include multiple functional blocks, multiple sub-circuits can be combined into a single functional block, functionality can be spread over and/or divided among multiple functional blocks, etc. Further, the functional blocks can include various hardware and/or software component(s) and/or module(s), including, but not limited to a circuit, an application specific integrated circuit (ASIC), or processor. The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. For example, the PAM to NRZ circuit 170' can be implemented as a circuit of a receiver system, such as a SERDES.

Embodiments of the RX AFE sub-circuit 210 can receive a PAM-X signal 155 (e.g., a PAM-X version of that CDR channel pulse response) and convert the PAM-X signal 155 to an appropriate set of digital values. The PAM-X signal 155 can be an analog signal that effectively quantizes the channel pulse response into X amplitude levels. For example, a PAM-4 signal shows transitions among four, substantially discrete amplitude levels; and those four levels can be converted by the RX AFE sub-circuit 210 into two-bit digital values (e.g., '00,' '01,' '10,' and '11'). Notably, PAM-X signals 155 (unlike NRZ signals) can include "stacked" transitions, such that the signal can transition multiple times in the same direction. This manifests certain difficulties for NRZ processing. For example, typical NRZ CDR processing looks for a sign of error, a previous state, and a current state, created by shifting registers by one sample period. Such register shifting in context of stacked transitions would generate incorrect transition data. Accordingly, implementations include novel techniques for generating pertinent inputs to the NRZ CDR circuit 180' (e.g., a MM NRZ CDR circuit).

The generated digital values can be passed to the signal buffer sub-circuit 220, which can collect a desired number of samples for processing. In some implementations, the signal buffer sub-circuit 220 includes a first-in-last-out (FILO) queue that can effectively transition to a slower clock domain. For example, As shown in FIG. 1, a clock generator circuit 180 (e.g., a clock divider) can generate various clock signals 185 to provide different clock domains. In some implementations, a first generated clock is N times faster (e.g., ten times faster) than a second generated clock. The first generated clock can be used by the RX AFE sub-circuit 210 and the signal buffer sub-circuit 220 to effectively fill an N-dimensional queue with samples, which can then be processed in parallel by the NRZ CDR circuit 180' using the slower clock domain of the second generated clock.

Figure 3:
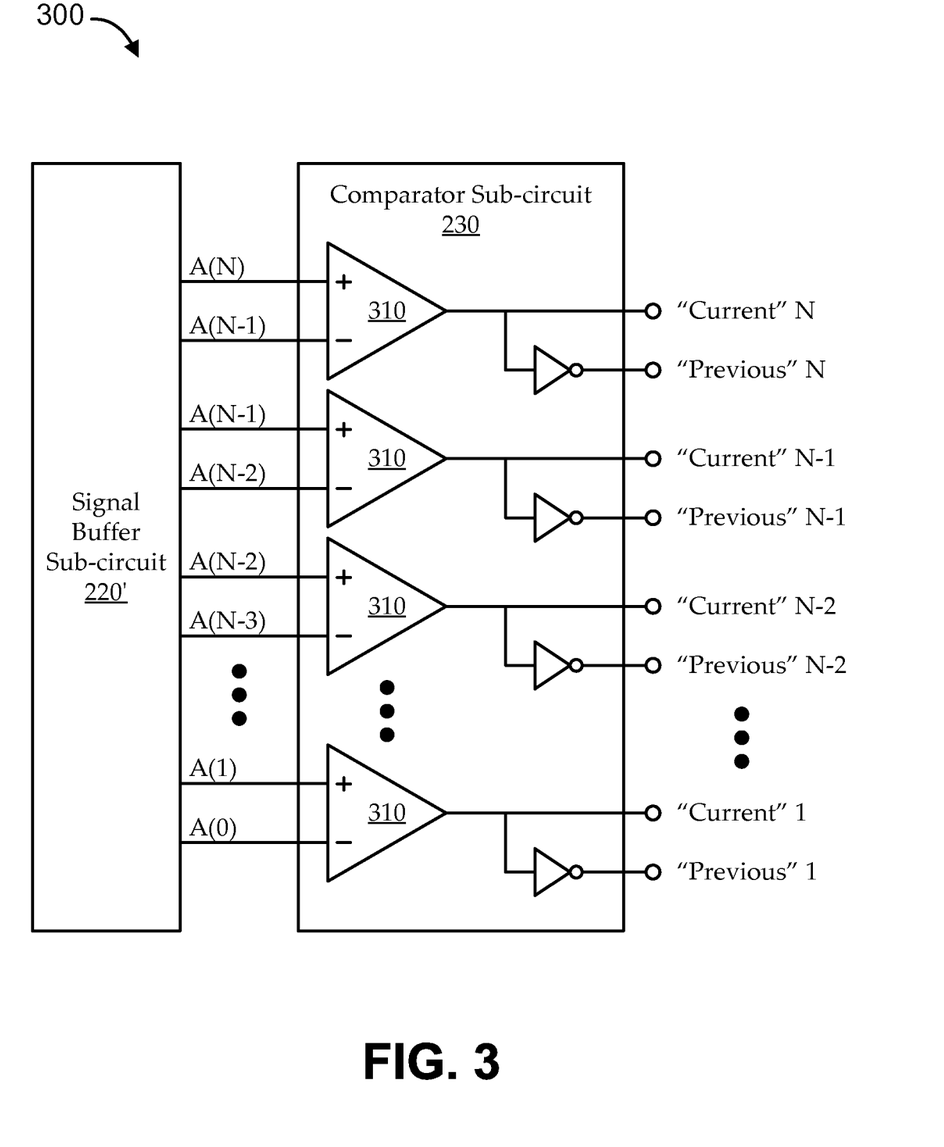
FIG. 3 shows a circuit diagram of an illustrative signal buffer sub-circuit and comparator sub-circuit, according to various embodiments.

Embodiments of the comparator sub-circuit 230 can perform parallel comparisons on the N-dimensional sample arrays to derive a pseudo-NRZ signal 157 that includes a pseudo-current NRZ state and a pseudo-previous NRZ state. For example, FIG. 3 shows a circuit diagram 300 of an illustrative signal buffer sub-circuit 220' and comparator sub-circuit 230', according to various embodiments. The signal buffer sub-circuit 220' is illustrated as an N+1-dimensional queue that effectively collects N+1 samples from the RX AFE sub-circuit 210 and outputs the samples as a parallel array. The comparator sub-circuit 230' can include comparator components 310 to compare each sample (A(j)) with its preceding sample (A(j−1)). The output of this comparison can then be used to generate a pseudo-current NRZ value at each (j) and a pseudo-previous NRZ value at each (j). As illustrated, the pseudo-previous NRZ value at each (j) can be the complement (e.g., 'NOT') of the pseudo-current NRZ value at each (j). The result, then, can be a 2N-dimensional array having N pseudo-current NRZ values and N pseudo-previous NRZ values. In effect, the comparator sub-circuit 230' can convert the N+1 PAM-X samples into a set of values that indicate respective up or down transitions.

Figure 4:
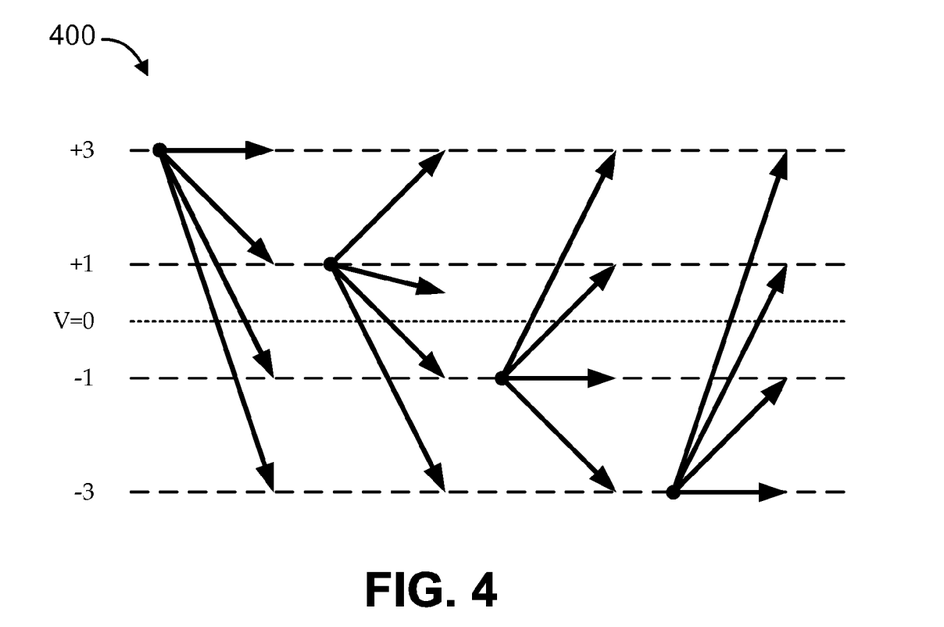
FIG. 4 shows a graph of all possible transitions for an illustrative PAM-4 implementation.
Figure 5:
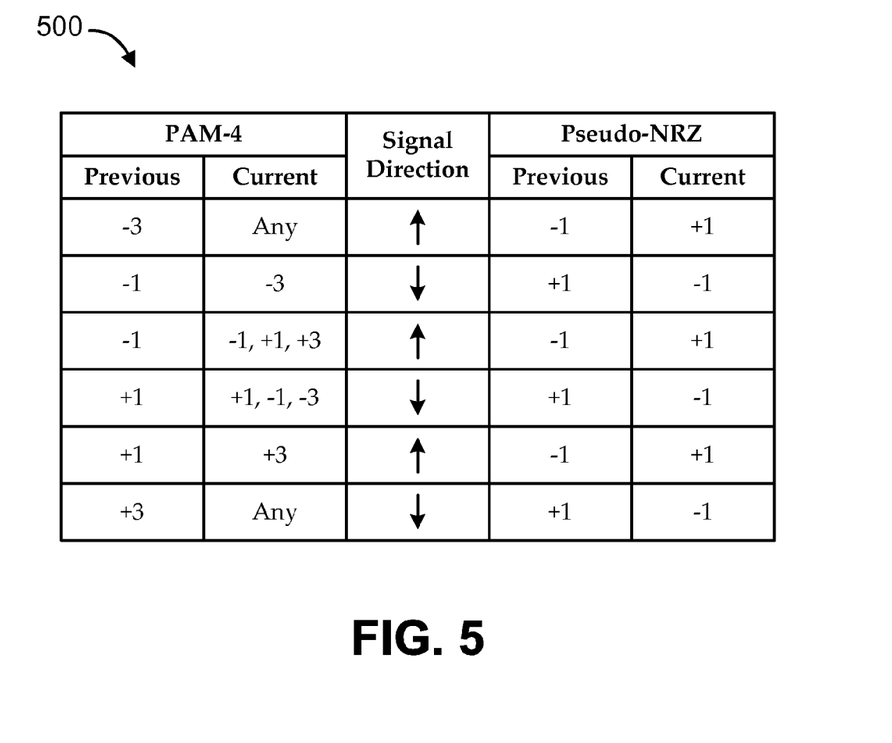
FIG. 5 shows a chart of possible translations between PAM-4 sample transitions and respective illustrative pseudo-NRZ transitions, according to one implementation.

For added clarity, FIGS. 4 and 5 show an illustrative set of transitions for a PAM-4 implementation and corresponding illustrative PAM to NRZ conversions. FIG. 4 shows a graph 400 of all possible transitions for an illustrative PAM-4 implementation. The illustrative PAM-4 implementation includes four amplitude levels at V=−3, −1, +1, and +3. A transition can potentially occur from any of these levels to any other of these levels, depending for example, on the speed of change (e.g., slope) of the channel pulse response at sampled locations with respect to the sampling rate. Accordingly, sixteen transitions are possible. For example, the PAM-4 signal can transition from V=−3 to any of V=−1, +1, or +3, or it could remain at V=−3 (also referred to as a transition for the sake of simplicity).

FIG. 5 shows a chart 500 of possible translations between PAM-4 sample transitions and respective illustrative pseudo-NRZ transitions, according to one implementation. As illustrated, when the PAM-4 samples transition from V=−3 to anything else, the channel pulse response signal can be considered as simply moving in an upward direction. Accordingly, NRZ data can be generated to indicate this upward movement. In particular, pseudo-NRZ values can be generated to look like an upward transition is occurring by generating a '−1' as the pseudo-previous state and a '+1' as the pseudo-current state. Similarly, when the PAM-4 samples transition from V=+3 to anything else, the channel pulse response signal can be considered as simply moving in a downward direction; and NRZ data can be generated to indicate this downward movement (e.g., a '+1' as the pseudo-previous state and a '−1' as the pseudo-current state). When the PAM-4 samples transition from V=−1 to V=−3, or from V=+1 to V=+1, −1, or −3, the channel pulse response signal can be considered as moving in a downward direction; and NRZ data can be generated to indicate this downward movement (e.g., a '+1' as the pseudo-previous state and a '−1' as the pseudo-current state). Similarly, when the PAM-4 samples transition from V=+1 to V=+3, or from V=−1 to V=−1, +1, or +3, the channel pulse response signal can be considered as moving in an upward direction; and NRZ data can be generated to indicate this upward movement (e.g., a '−1' as the pseudo-previous state and a '+1' as the pseudo-current state).

The illustrated implementation treats a lack of change from one sample to another as either an upward or a downward movement (e.g., V=−3 to V=−3 is treated as an upward signal movement, while V=+3 to V=+3 is treated as a downward signal movement). However, such transitions can be treated as either upward or downward movement, typically without resulting in any appreciable statistical difference. For example, the illustrated implementation is substantially symmetrical, which can minimize any statistical bias, simplify the implementation, etc. A similar chart 500 can be generated for any number of levels of PAM-X data to effectively convert the PAM-X transitions into a respective "up" or "down" bucket, so that this approach can be extended to any X levels.

Returning to FIG. 2, the output of the comparator sub-circuit 230 can be a pseudo-NRZ signal 157 that includes pseudo-previous states and pseudo-current states. Those states can be passed to the NRZ CDR circuit 180', and can look the statistically the same to the NRZ CDR circuit 180' as if the input signal were an NRZ signal with corresponding NRZ transitions. In this way, the PAM-X signal 155 of any X can be used by the NRZ CDR circuit 180' as an NRZ signal.

Implementations of the NRZ CDR circuit 180' can look for a previous state, a current state, and an error value (e.g., a sign of error) to make an offset decision (i.e., early or late). As illustrated, some embodiments of the error generator sub-circuit 250 can use the sampled values from the RX AFE sub-circuit 210 to generate an error value. For example, the error generator sub-circuit 250 can be designed to output one error value when the signal is apparently increasing, and a complementary value when the signal is apparently decreasing. Some implementations of the error generator sub-circuit 250 can operate at the faster clock domain of the RX AFE sub-circuit 210, so that an error value is generated to correspond with each generated sample value. The error values can be buffered by an error buffer sub-circuit 260. In some implementations, the error buffer sub-circuit 260 can include a first-in-first-out (FIFO) queue. For example, the FIFO queue can effectively queue the same number of values as that of the FILO queue used for the signal buffer sub-circuit 220. In this way, at each clock cycle of the NRZ CDR circuit 180' (the slower clock domain), the NRZ CDR circuit 180' can have a pseudo-previous state, a pseudo-current state, and an error value at its inputs to make its offset decision. The NRZ CDR circuit 180' can generate an offset signal in accordance with the offset decision.

For the sake of illustration, the NRZ CDR circuit 180' can include a voting circuit that receives a channel pulse response as the pseudo-NRZ signal, receives a clocking signal (e.g., one of the generated clock signals 185 that substantially tracks, or is derived from, the reference clock signal 145), and outputs an "early" or "late" vote. Each vote can be generated by iteratively comparing a sample location of the channel pulse response at the clocking location to a zero crossing to determine if the sample appears to be early or late. The votes can be tallied over a voting window. For example, the tallying can be performed by the NRZ CDR circuit 180' and/or by a sub-circuit (e.g., a vote counting circuit) of the clock generator circuit 180. The clock generator circuit 180 can then use the tallied votes to make an offset decision. In some implementations, the clock generator circuit 180 can include a phase adaptation circuit that determines an appropriate clock phase offset to apply according to the voting results tallied over a window. For example, if more early votes are tallied, a phase shift will be applied to shift the clocking later; and if more late votes are tallied, a phase shift will be applied to shift the clocking earlier. The clock generator circuit 180 can then apply the phase shift to the reference clock signal 145 when generating the generated clock signals 185. For example, the phase shifting can reduce clocking error introduced from jitter, inter-symbol interference, and the like.

Figure 6:
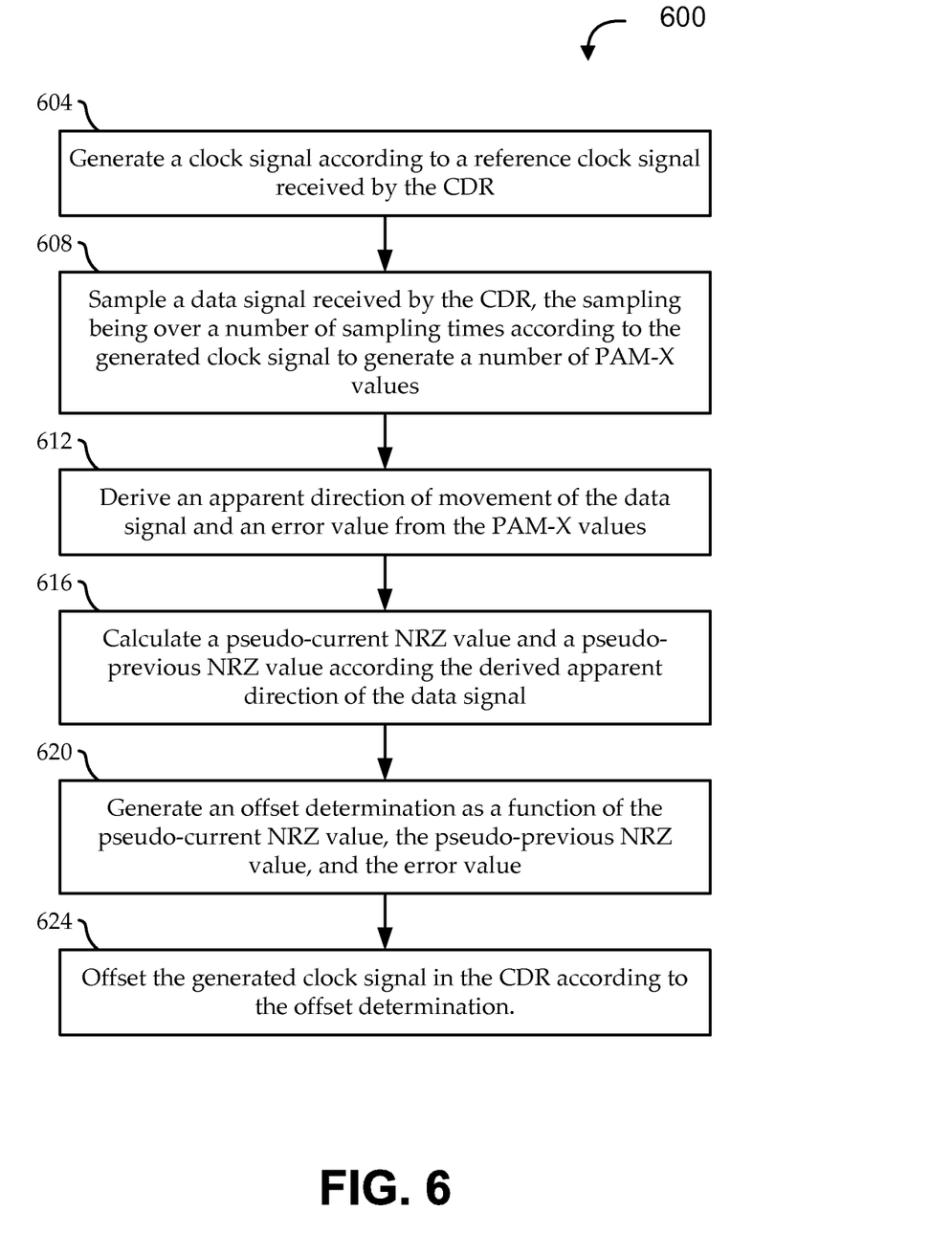
FIG. 6 shows a flow diagram of an illustrative method for clock data recovery, according to various embodiments.

FIG. 6 shows a flow diagram of an illustrative method 600 for clock data recovery, according to various embodiments. Embodiments of the method 600 begin at stage 604 by generating a clock signal according to a reference clock signal received by a CDR. At stage 608, a data signal received by the CDR can be sampled over a number of sampling times according to the generated clock signal to generate a number of PAM-X values. An apparent direction of movement of the data signal and an error value can be derived from the PAM-X values at stage 612. At stage 616, a pseudo-current NRZ value and a pseudo-previous NRZ value can be calculated according the derived apparent direction of the data signal. An offset determination can be generated at stage 620 as a function of the pseudo-current NRZ value, the pseudo-previous NRZ value, and the error value. At stage 624, the generated clock signal in the CDR can be offset (e.g., phase shifted) according to the offset determination.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for at-rate clock data recovery (CDR), the system comprising:
   a clock generator circuit disposed to generate a clock signal according to a received reference clock signal;
   a PAM (pulse amplitude modulation) to NRZ (not-return-to-zero) circuit disposed to:
      sample a received data signal over a plurality of sampling times according to the generated clock signal to generate a plurality of PAM-X values;
      derive an apparent direction of movement of the data signal and an error value from the plurality of PAM-X values; and
      calculate a pseudo-current NRZ value and a pseudo-previous NRZ value according the derived apparent direction of the data signal; and
   an at-rate CDR circuit disposed to generate an offset determination as a function of the pseudo-current NRZ value, the pseudo-previous NRZ value, and the error value.

2. The system of claim 1, wherein the clock generator circuit is further disposed to offset the generated clock signal in the CDR system according to the offset determination.

3. The system of claim 1, wherein the PAM to NRZ circuit comprises:
   a receiver analog front-end sub-circuit disposed to sample the received data signal;
   a signal buffer sub-circuit disposed to parallelize sets of the sampled PAM-X values; and
   a comparator sub-circuit disposed to calculate sets of pseudo-current NRZ values and sets of pseudo-previous NRZ values as a function of the parallelized sets of sampled PAM-X values.

4. The system of claim 1, wherein the PAM to NRZ circuit is disposed to calculate by:
   calculating the pseudo-current NRZ value to be '+1' and the pseudo-previous NRZ value to be '−1' when the derived apparent direction of movement corresponds to an upward direction of the data signal; and
   calculating the pseudo-current NRZ value to be '−1' and the pseudo-previous NRZ value to be '+1' when the derived apparent direction of movement corresponds to a downward direction of the data signal.

5. The system of claim 1, wherein the PAM to NRZ circuit is disposed to derive the apparent direction of movement of the data signal by:
   deriving an upward direction of movement when a first of the PAM-X values is greater than or equal to a second of the PAM-X values, the second of the PAM-X values sampled at a sample time that is previous and adjacent to that of the first of the PAM-X values; and
   deriving a downward direction of movement otherwise.

6. The system of claim 1, wherein one of the pseudo-current NRZ value or the pseudo-previous NRZ value is calculated to be the complement of the other of the pseudo-current NRZ value or the pseudo-previous NRZ value.

7. The system of claim 1, wherein:
   the clock generator circuit is disposed to generate the clock signal by generating a first clock signal having a clocking frequency substantially matching that of the reference clock signal, and generating a second clock signal having a clocking frequency that is N times that of the reference clock signal, wherein N is an integer greater than one;
   the PAM to NRZ circuit is disposed to sample the received data signal according to the second clock signal; and
   the at-rate CDR circuit is disposed to generate the offset determination according to the first clock signal.

8. The system of claim 1, wherein the at-rate CDR circuit is disposed to generate the offset determination as a function either of the pseudo-current NRZ value and the pseudo-previous NRZ value or of an NRZ data signal comprising an actual current NRZ value and an actual previous NRZ value.

9. The system of claim 1, further comprising:
   a front-end subsystem communicatively coupled with a communications channel and disposed to generate the data signal for communication to the PAM to NRZ circuit from data received via the communications channel.

10. A method for at-rate clock data recovery (CDR) in a CDR system, the method comprising:
    generating a clock signal according to a reference clock signal received by the CDR system;
    sampling a data signal received by the CDR system, the sampling being over a plurality of sampling times according to the generated clock signal to generate a plurality of PAM-X (pulse amplitude modulation-X) values;
    deriving an apparent direction of movement of the data signal and an error value from the plurality of PAM-X values;
    calculating a pseudo-current NRZ (not-return-to-zero) value and a pseudo-previous NRZ value according the derived apparent direction of the data signal;
    generating an offset determination as a function of the pseudo-current NRZ value, the pseudo-previous NRZ value, and the error value; and
    offsetting the generated clock signal in the CDR system according to the offset determination.

11. The method of claim 10, wherein the calculating comprises:
    calculating the pseudo-current NRZ value to be '+1' and the pseudo-previous NRZ value to be '−1' when the derived apparent direction of movement corresponds to an upward direction of the data signal; and
    calculating the pseudo-current NRZ value to be '−1' and the pseudo-previous NRZ value to be '+1' when the derived apparent direction of movement corresponds to a downward direction of the data signal.

12. The method of claim 10, wherein deriving the apparent direction of movement of the data signal comprises:
    deriving an upward direction of movement when a first of the PAM-X values is greater than or equal to a second of the PAM-X values, the second of the PAM-X values sampled at a sample time that is previous and adjacent to that of the first of the PAM-X values; and
    deriving a downward direction of movement otherwise.

13. The method of claim 10, wherein deriving the apparent direction of movement of the data signal comprises:
    deriving a downward direction of movement when a first of the PAM-X values is less than or equal to a second of the PAM-X values, the second of the PAM-X values sampled at a sample time that is previous and adjacent to that of the first of the PAM-X values; and
    deriving an upward direction of movement otherwise.

14. The method of claim 10, further comprising:
    buffering at least N of the PAM-X values in a buffer to parallelize the at least N PAM-X values, wherein the deriving is performed in parallel on the buffered at least N PAM-X values.

15. The method of claim 10, wherein one of the pseudo-current NRZ value or the pseudo-previous NRZ value is calculated to be the complement of the other of the pseudo-current NRZ value or the pseudo-previous NRZ value.

16. The method of claim 10, wherein the generated clock signal has a clocking frequency that is N times a clocking frequency of the reference clock signal, wherein N is an integer greater than one.

17. The method of claim 10, wherein:
generating the clock signal comprises generating a first clock signal having a clocking frequency substantially matching that of the reference clock signal, and generating a second clock signal having a clocking frequency that is N times that of the reference clock signal, wherein N is an integer greater than one;
the sampling is performed according to the second clock signal; and
the generating is performed according to the first clock signal.

18. The method of claim 10, wherein the generated clock signal is derived from the data signal.

19. A circuit for at-rate clock data recovery (CDR), the circuit comprising:
a receiver analog front-end sub-circuit disposed to sample a received data signal over a plurality of sampling times according to a generated clock signal derived from the data signal, such that the sampling generates a plurality of PAM-X (pulse amplitude modulation-X) values;
a signal buffer sub-circuit disposed to parallelize sets of the sampled PAM-X values; and
a comparator sub-circuit disposed to:
derive apparent directions of movement of the data signal and error values from the parallelized sets of sampled PAM-X values; and
calculate pseudo-current NRZ (not-return-to-zero) values and pseudo-previous NRZ values according the derived apparent directions of the data signal.

20. The circuit of claim 19, further comprising:
an at-rate CDR sub-circuit disposed to generate an offset determination as a function of the pseudo-current NRZ value, the pseudo-previous NRZ value, and the error value, the offset determination usable to offset a phase of the generated clock signal.

* * * * *